United States Patent
Shutt et al.

(10) Patent No.: US 9,053,162 B2
(45) Date of Patent: Jun. 9, 2015

(54) MULTI-TENANT HOSTED APPLICATION SYSTEM

(75) Inventors: David Robert Shutt, Seattle, WA (US); Michael James Ott, Redmond, WA (US); Nirav Yogesh Shah, Seattle, WA (US); Jagan Peri, Issaquah, WA (US); Ramesh T. Bangalore, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 12/147,588

(22) Filed: Jun. 27, 2008

(65) Prior Publication Data
US 2009/0049056 A1    Feb. 19, 2009

Related U.S. Application Data

(63) Continuation-in-part of application No. 11/789,993, filed on Apr. 26, 2007.

(51) Int. Cl.
 G06F 17/30 (2006.01)
(52) U.S. Cl.
 CPC .............................. G06F 17/30575 (2013.01)
(58) Field of Classification Search
 USPC ......... 707/610, 640, 661, 758, 782, 783, 784, 707/791, 802, 999.201, 999.202, 999.203, 707/999.204; 709/218, 225, 226; 718/100
 See application file for complete search history.

(56) References Cited

U.S. PATENT DOCUMENTS

| | | | |
|---|---|---|---|
| 6,606,627 B1 | 8/2003 | Guthrie et al. | |
| 6,990,666 B2 | 1/2006 | Hirschfeld et al. | |
| 6,993,657 B1 | 1/2006 | Renner et al. | |
| 1,777,872 A1 | 5/2006 | Birkestand et al. | |
| 7,100,195 B1 | 8/2006 | Underwood | |
| 7,987,167 B1* | 7/2011 | Kazar et al. | 707/705 |
| 7,996,525 B2 | 8/2011 | Stienhans et al. | |
| 8,190,740 B2 | 5/2012 | Stienhans et al. | |
| 8,843,690 B2 | 9/2014 | Podvalny et al. | |
| 2002/0049608 A1 | 4/2002 | Hartsell et al. | |
| 2002/0049841 A1* | 4/2002 | Johnson et al. | 709/225 |
| 2002/0133392 A1* | 9/2002 | Angel et al. | 705/10 |

(Continued)

OTHER PUBLICATIONS

Chong et al., "Building Distributed Applications: Architecture Strategies for Catching the Long Tail," Apr. 2006, Microsoft Corporation.

(Continued)

*Primary Examiner* — Syling Yen
(74) *Attorney, Agent, or Firm* — Damon Rieth; Jim Ross; Micky Minhas (57) ABSTRACT

Technologies are described herein for implementing a hosted multi-tenant application system. The server computers utilized to provide the hosted application are organized into logical groupings of server computers called scale groups. One or more tenants are assigned to each scale group. When a new tenant is provisioned, the tenant is assigned to a scale group and a database server in the assigned scale group creates a database for the tenant. An association between the tenant and the scale group is also created in a shared configuration database. When a request is received from a tenant to access the hosted application, the shared configuration database is consulted to locate the scale group hosting the tenant. Once the appropriate scale group has been located, the request is redirected to the appropriate scale group for processing.

17 Claims, 8 Drawing Sheets

(56) References Cited

U.S. PATENT DOCUMENTS

| | | | |
|---|---|---|---|
| 2003/0051021 A1 | 3/2003 | Hirschfeld et al. | |
| 2003/0051195 A1* | 3/2003 | Bosa et al. | 714/43 |
| 2003/0088616 A1 | 5/2003 | Etessami et al. | |
| 2003/0212654 A1 | 11/2003 | Harper et al. | |
| 2004/0073786 A1* | 4/2004 | O'Neill et al. | 713/155 |
| 2004/0117220 A1 | 6/2004 | Chess et al. | |
| 2005/0049937 A1 | 3/2005 | Sanders | |
| 2005/0182745 A1 | 8/2005 | Dhillon et al. | |
| 2005/0188345 A1 | 8/2005 | Chang et al. | |
| 2005/0283478 A1 | 12/2005 | Choi et al. | |
| 2006/0059035 A1 | 3/2006 | Kraft et al. | |
| 2006/0069717 A1 | 3/2006 | Mamou et al. | |
| 2006/0178918 A1 | 8/2006 | Mikurak | |
| 2006/0195476 A1 | 8/2006 | Nori et al. | |
| 2006/0247944 A1 | 11/2006 | Calusinski et al. | |
| 2007/0067354 A1 | 3/2007 | Mullender et al. | |
| 2007/0130137 A1 | 6/2007 | Oliver et al. | |
| 2007/0156902 A1* | 7/2007 | Becker | 709/226 |
| 2007/0162537 A1 | 7/2007 | Juncker | |
| 2008/0040335 A1 | 2/2008 | Gatti et al. | |
| 2008/0086479 A1 | 4/2008 | Fry et al. | |
| 2009/0288084 A1 | 11/2009 | Astete et al. | |
| 2009/0293056 A1 | 11/2009 | Ferris | |
| 2010/0169489 A1 | 7/2010 | Akiyama et al. | |
| 2011/0131335 A1 | 6/2011 | Spaltro et al. | |
| 2011/0161696 A1 | 6/2011 | Fletcher | |
| 2011/0185208 A1 | 7/2011 | Iwamoto et al. | |
| 2011/0231680 A1 | 9/2011 | Padmanabhan et al. | |
| 2011/0252137 A1 | 10/2011 | Steinhans et al. | |

OTHER PUBLICATIONS

Multitenant Platforms, salesforce.com, downloaded Apr. 28, 2008.
A2ZApplications.Com India's First Multi-Tenant, Multi-Utility Software-as-a-Service Platform, A2ZApplications.com, downloaded Apr. 28, 2008.
U.S. Official Action dated Jul. 15, 2010 in U.S. Appl. No. 11/789,993.
Clifton, et al. "Privacy-Preserving Data Integration and Sharing," Jun. 2004, DMKD '04, Paris France, pp. 19-26.
Kim et al. "A Distributed Object-Oriented Database System Supporting Shared and Private Databases," Jan. 1991, ACM Transactions on Information Systems, vol. 9, No. 1, pp. 31-51.
U.S. Official Action dated Jan. 4, 2011 in U.S. Appl. No. 11/789,993.
Vmware vSphere, http:www.vmware.com/prodicys/drs/features.html, downloaded Aug. 26, 2011, pages.
Urgaonkar et al., "Dynamic Resource Allocation and Power Management in Virtualized Data Centers," Apr. 2010, Proc. IEEE/IFIP NOMS, 8 pages.
"CloudShare ProPlus FAQs," downloaded Aug. 26, 2011 from http://www.cloudshare.com/Products/CloudShare-ProPlus/FAQ.aspx, 12 pages.
U.S. Notice of Allowance / Allowability dated Oct. 21, 2011 in U.S. Appl. No. 11/789,993.
U.S. Official Action dated Jun. 23, 2011 in U.S. Appl. No. 11/789,993.
U.S. Official Action dated Dec. 19, 2013 in U.S. Appl. No. 13/293,097.
U.S. Notice of Allowance dated May 21, 2014 in U.S. Appl. No. 13/293,097.
Office action for U.S. Appl. No. 14/490,217, mailed on Mar. 13, 2015, Bjerke et al., "Managing Capacity in a Data Center by Suspending Tenants", 8 pages.
Chinese Official Action dated Sep. 25, 2014 in Chinese Application No. CN 201210445077.0.
International Search Report dated May 7, 2013 in International Application No. PCT/US12/064007.
U.S. Official Action dated Aug. 30, 2013 in U.S. Appl. No. 13/293,097.

* cited by examiner

MULTI-TENANT HOSTED APPLICATION SYSTEM

CROSS-REFERENCE TO RELATED APPLICATIONS

This application is a continuation-in-part of U.S. patent application Ser. No. 11/789,993, entitled "HOSTED MULTI-TENANT APPLICATION WITH PER-TENANT UNSHARED PRIVATE DATABASES," which was filed on Apr. 26, 2007, and which is expressly incorporated by reference herein in its entirety.

BACKGROUND

A hosted application is a software application where the software resides on servers that are accessed through a wide-area network, such as the Internet, rather than more traditional software that is installed on a local server or on individual client computers. Hosted applications may also be known as Internet-applications, application service providers ("ASPs"), web-based applications, or on-line applications. Hosted applications are commonly utilized concurrently by multiple subscriber organizations, called "tenants."

Some hosted applications utilize a multi-tier architecture wherein the middle-tier that performs the application logic is separated from the database-tier where application and tenant data is stored. In many cases, the database-tier is shared among all of the tenants. Use of a shared database-tier in this manner is problematic, however, because a scheduled or unscheduled database outage in such a system will affect all of the tenants simultaneously. Moreover, because all tenants share the same database-tier, application performance for all of the tenants may be significantly reduced if just one tenant places an excessive load on the database. Reduced performance may be unacceptable to the tenants of such a system. Additionally, when a single database is utilized for all of the tenants of a hosted application, it may be difficult for a tenant to customize the schema that is utilized to store the database.

Other hosted applications utilize a multi-tier architecture wherein each tenant utilizes a middle-tier and a database-tier that are maintained separately from all other tenants. This type of architecture may be implemented, for instance, by providing each tenant with a virtual server computer for hosting the middle-tier and the database-tier. This type of architecture allows outages to be confined to a single tenant or a small group of tenants, and reduces the possibility that an excessive load by one tenant will impact application performance for other tenants. This type of architecture, however, suffers from several other significant drawbacks. In particular, it can be complex and expensive to operationally maintain the separate operating system and application installation on the virtual server computer provided for each hosted tenant. Moreover, allocated hardware resources may remain unused by tenants that cannot utilize all of the processing and storage capabilities of a dedicated virtual server computer.

Hosted multi-tenant applications implemented using previous architectures also suffer from several other limitations. In particular, it may be very difficult to add additional hardware capacity to these systems or to upgrade software components without causing downtime for the tenants. Additionally, it may also be difficult to geographically distribute the processing and data storage capabilities of systems that are implemented using these previous architectures.

It is with respect to these considerations and others that the disclosure made herein is provided.

SUMMARY

Technologies are described herein for implementing a hosted multi-tenant application system. Through the utilization of aspects presented herein, a hosted application can be provided in a manner that permits the hardware and software of the system to be upgraded without downtime for tenants. Moreover, through the use of the aspects presented herein, the processing and data storage capabilities of a hosted multi-tenant application program can be geographically distributed to thereby reduce latency for the tenants and to reduce the number of tenants that are impacted by a data center outage.

According to one aspect presented herein, a hosted application is provided that supports concurrent use by multiple tenants. The hosted application may be a hosted business application, such as a customer relationship management ("CRM") application, or another type of business application. The hosted application is provided through the use of a middle-tier that is shared by the tenants of the hosted application. The middle-tier represents the software and hardware components that provide the hosted application to the tenants, including the performance of any business logic implemented by the application. A database-tier operates in conjunction with the middle-tier.

According to other aspects presented herein, the server computers utilized to provide the hosted application are organized into site-wide server computers ("servers") and scale groups. The site-wide server computers perform site-wide functions for the hosted application, including processing sign-in and sign-up requests, site-wide messaging, help functions, and domain name services ("DNS") for mapping each tenant to an assigned scale group. The site-wide server computers may also provide facilities for site configuration, billing, customer support, and others.

The scale groups represent logical groupings of servers. Each scale group includes a shared middle-tier and a database-tier for supporting tenants assigned thereto. When a new tenant is provisioned, the tenant is assigned to a scale group and a database server in the assigned scale group creates a private, unshared database for the tenant. An association between the tenant and the scale group is also created in a shared configuration database. When a request is received from a tenant to access the hosted application, the shared configuration database is consulted to locate the scale group hosting the private, unshared database for the tenant. Once the appropriate scale group has been located, the request is redirected to the middle-tier in the appropriate scale group for processing. According to embodiments, the scale groups may be geographically distributed.

According to other aspects, each of the site-wide server computers may be assigned to one or more roles. In particular, according to one implementation, each site-wide server may be assigned to a portal role for providing a non-tenant specific user interface, to a name role for providing network addresses corresponding to sub-domains that are unique to each tenant, to a configuration role for providing configuration information to one or more other roles, to an administration role for performing administrative tasks within the system, and/or to a router role for redirecting actions to an appropriate scale group. Servers in each of the scale groups may also be assigned to one or more roles. For instance, scale group servers may be assigned to an application role for providing the hosted application to the tenants, an asynchronous processing role for executing asynchronous processes assigned by the application role, a scale group configuration role for maintaining scale group configuration information, and/or a database role for maintaining data for tenants assigned to the scale group. Other roles may also be assigned to the site-wide server computers and the scale group servers.

According to additional aspects, the average workload of scale groups and the individual server computers within scale groups is monitored. If a particular server within a scale group is experiencing an excessive average workload, responsibility for servicing one or more tenants may be moved to another server computer within the scale group. If a particular scale group is experiencing an excessive average workload, responsibility for servicing one or more tenants may be moved to another scale group. When responsibility for servicing a tenant is moved, the mapping stored in the shared configuration database is updated to reflect the new server or scale group responsible for servicing requests received from the tenant.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1-2C are software architecture diagrams illustrating aspects of a software architecture utilized in several of the embodiments presented herein;

DETAILED DESCRIPTION

The following detailed description is directed to technologies for providing a hosted multi-tenant application. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
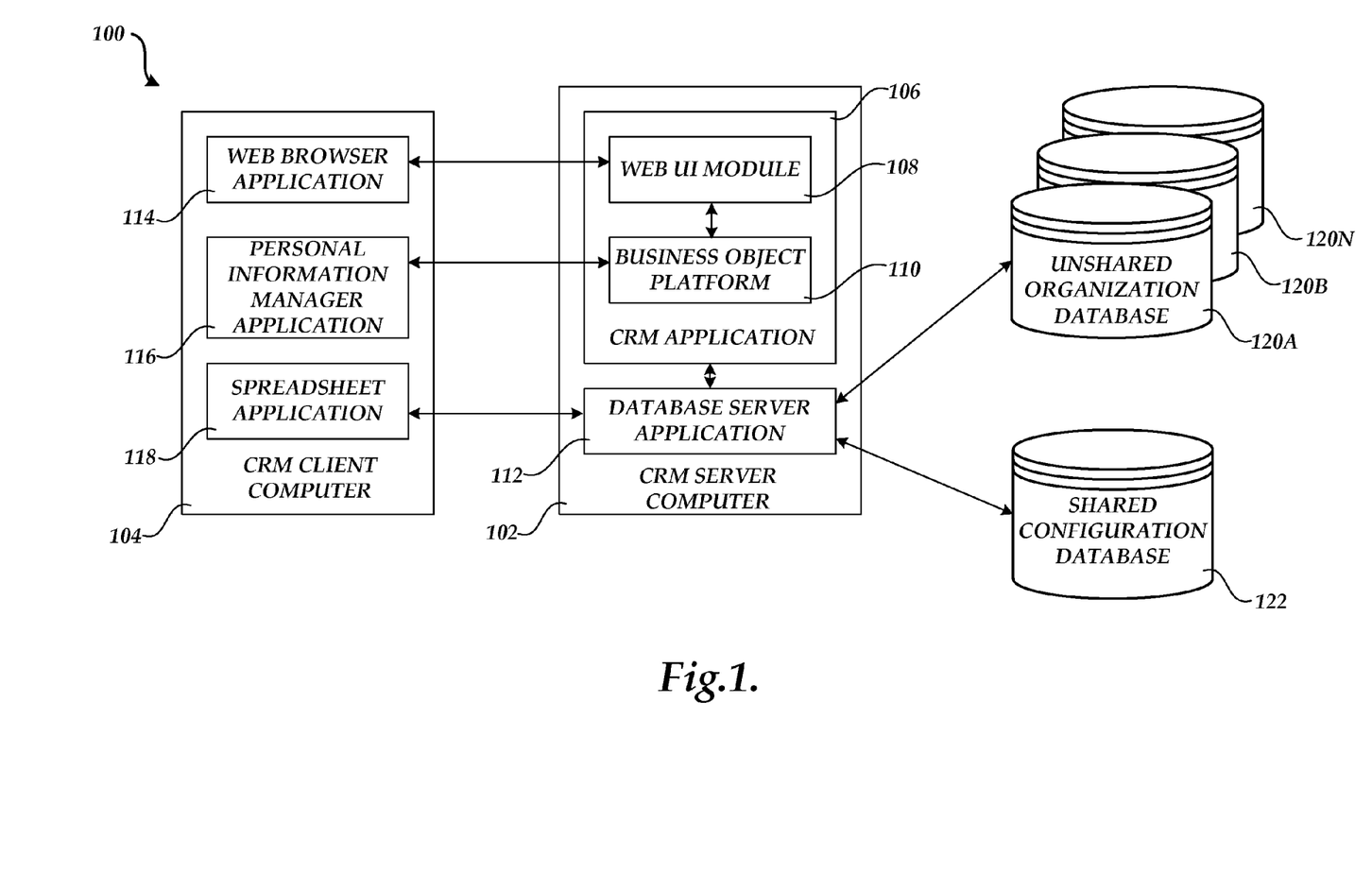

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a hosted, multi-tenant application program will be described. In particular, FIG. 1 is a network and software architecture diagram that provides details regarding an illustrative operating environment for the embodiments presented herein along with aspects of several software components presented herein. As discussed briefly above, the illustrative computing system 100 shown in FIG. 1 provides a hosted, multi-tenant application program. In the embodiments presented herein, the application program is a program for providing CRM functionality. CRM applications allow businesses to manage the relationships with their customers, including the capture, storage, and analysis of customer information. It should be appreciated, however, that any type of hosted application may be implemented utilizing the technologies presented herein, including other types of hosted business applications.

Through the use of the system 100 shown in FIG. 1, multiple organizations, referred to herein as "tenants," may concurrently utilize the computing resources provided by the system 100. The illustrative computing system 100 shown in FIG. 1 includes a CRM server computer 102. The CRM server computer 102 executes a CRM application 106 and maintains one or more associated databases, described more fully herein. The CRM application 106 provides functionality for managing relationships with business customers, including the capture, storage, and analysis of customer information.

The CRM functionality provided by the CRM application 106 may be accessed through the use of a web browser application 114 executing on a client computer, such as the CRM client computer 104. In this regard, the CRM application 106 includes a web user interface ("UI") module 108 for exposing a web-compatible network interface. In this manner, the CRM client computer 104 can be utilized to access functionality provided by the CRM application 106 for creating and viewing customer information, for communicating with customers via the CRM application 106, and for performing other CRM-related functions.

According to embodiments presented herein, the CRM application 106 also includes a business object platform 110. The business object platform 110 is a software platform for executing software components that perform the actual business processing for the CRM application 106. The business object platform 110 operates in conjunction with the web UI module 108 to make this functionality accessible through a web interface. Aspects of the functionality provided by the CRM application 106 may also be accessed through a plug-in to a personal information manager ("PIM") application 116. In one embodiment, a plug-in executing within the PIM application 116 communicates directly with the business object platform 110 to enable this functionality.

As shown in FIG. 1, the CRM application 106 operates in conjunction with a database server application 112, which also executes on the CRM server computer 102. The database server application 112 provides functionality for creating, maintaining, accessing, and updating one or more databases. According to embodiments, the database server application 112 comprises the SQL SERVER database server application from MICROSOFT CORPORATION of Redmond, Wash. It should be appreciated that any suitable database server application may be utilized in the manner described herein.

Through the use of the database server application 112, the CRM application 106 is operative to maintain several databases. In particular, the CRM application 106 maintains a shared configuration database 122. As will be described in greater detail herein, the CRM application 106 utilizes the shared configuration database 122 to store global system-level information and data that is shared by the tenants. For instance, according to embodiments, the shared configuration database 122 may be utilized to store information about tenants, such as their name and contact information, information about which tenant particular users are members of, and information mapping authentication data to a specific user. In one implementation presented herein, the shared configuration database 122 is also utilized to store data defining a scale group to which each tenant hosted by the CRM application 106 has been assigned. Additional details regarding the use of the data in this regard will be provided below.

The CRM application 106 also maintains the unshared organization databases 120A-120N. The unshared organization databases 120A-120N are utilized by the CRM application 106 to store private, unshared data for the tenants. Each unshared organization database 120A-120N is associated with a particular tenant and its contents are inaccessible to the other tenants. According to aspects, each unshared organization database 120A-120N is utilized to store private tenant data for the associated tenant. Each unshared organization database 120A-120N may also be utilized to store customizations to the CRM application 106 made by the associated tenant including, but not limited to, customized entities, attributes, relationships, forms, views, code-level extensibility plug-ins, and any other type of customization to the CRM application 106. Additional details regarding the creation and use of the shared configuration database 122 and the unshared organization databases 120A-120N will be provided below. It should be appreciated that other types of databases and database schema may be utilized to store the global system-level information and the tenant data according to embodiments.

Figure 2A:
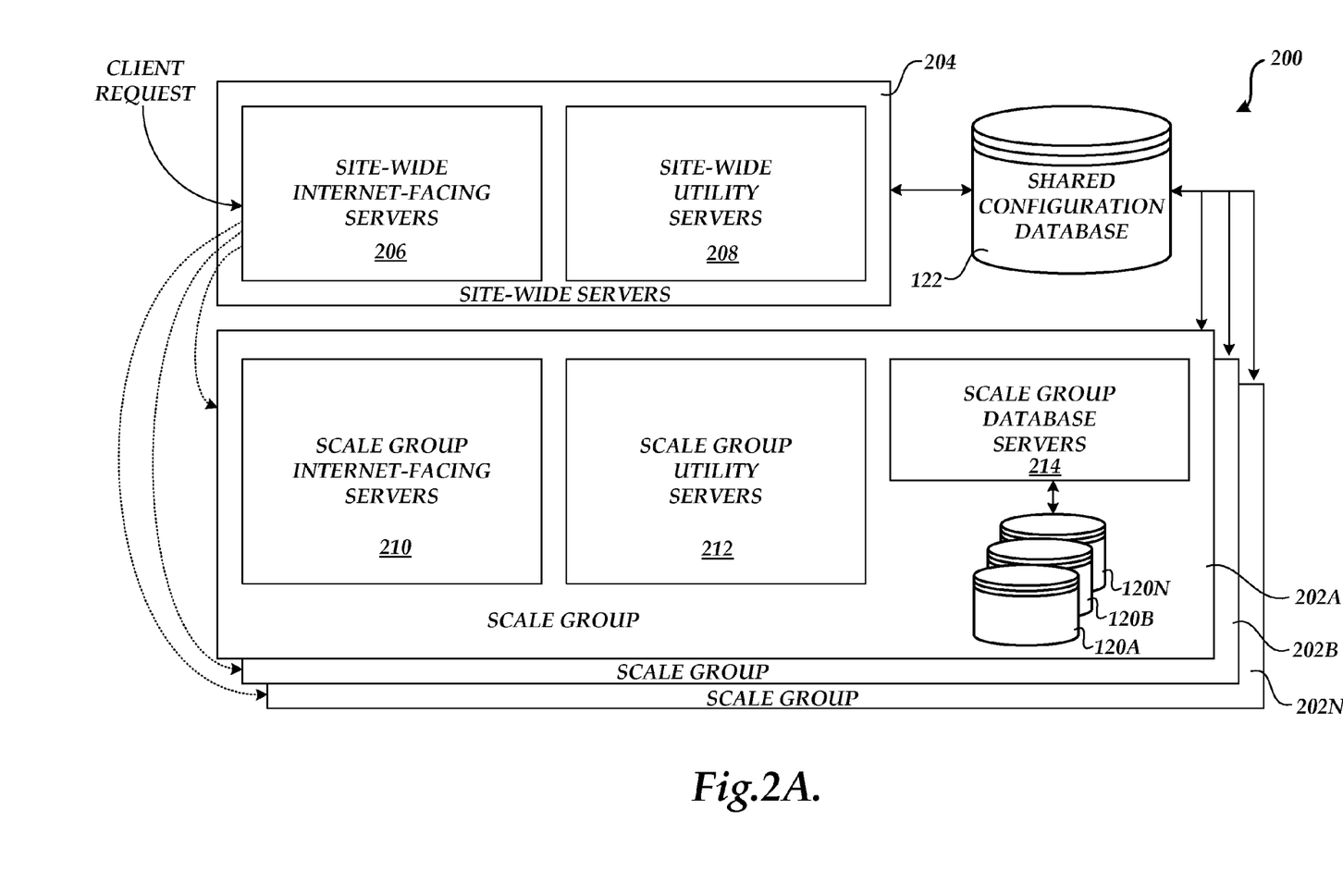

Referring now to FIG. 2A, another embodiment of the invention for providing a hosted, multi-tenant application that utilizes per-tenant unshared private databases will be described. In this embodiment, a system 200 is provided wherein the servers that provide the CRM functionality described herein are organized into the scale groups 202A-202N. The scale groups 202A-202N are logical groupings of servers, each of which has one or more tenants assigned thereto.

In one implementation, each scale group 202A-202N includes a shared middle-tier and a database-tier for supporting the tenants assigned to the scale group. The scale group Internet-facing servers 210 implement the middle-tier by executing the CRM application 106, while the scale group database servers 214 implement the database-tier by executing the database server application 112. One or more scale group utility servers 212 are also provided within each scale group 202A-202N for performing utility functions, such as reporting services, load balancing, provisioning, configuration, statistics, and others. Each scale group may also include its own configuration database that is private to the scale group but shared amongst all of the tenants of the scale group. As will be described in greater detail below, the servers in each of the scale group 202A-202N may be assigned to one or more roles for performing these functions.

When a new tenant is provisioned within the system 200, the tenant is assigned to one of the scale groups 202A-202N. At this time, one of the scale group database servers 214 in the assigned scale group creates a private, unshared database 120 for the tenant. In this manner, the private, unshared database 120 for the new tenant is created and stored in the assigned scale group 202. An association, or mapping, between the tenant and the assigned scale group 202 is also created in the shared configuration database 122.

As shown in FIG. 2A, the system 200 also includes one or more site-wide servers 204. In particular, one or more site-wide Internet-facing servers 206 are provided along with one or more site-wide utility servers 208. The site-wide Internet-facing servers 206 perform site-wide functions for the system 200, including processing sign-in and sign-up requests, site-wide messaging, help functions, and DNS functions for mapping each tenant to the appropriate scale group 202A-202N. The site-wide utility servers 208 provide facilities for site configuration, billing, customer support, and others. As will also be discussed in greater detail below, the site-wide servers 204 may also be assigned to one or more roles for performing these functions.

As will be described in greater detail below, network client requests to access the hosted application are received at the site-wide Internet-facing servers 206. In response to receiving such requests, the shared configuration database 122 is consulted to locate the scale group 202A-202N hosting the private, unshared database 120 for the tenant making the request. Once the appropriate scale group 202A-202N has been located, the incoming request is redirected to the scale group Internet-facing servers 210 in the identified scale group 202A-202N for processing. Additional details regarding this process will be provided below with respect to FIG. 4.

Figure 2B:
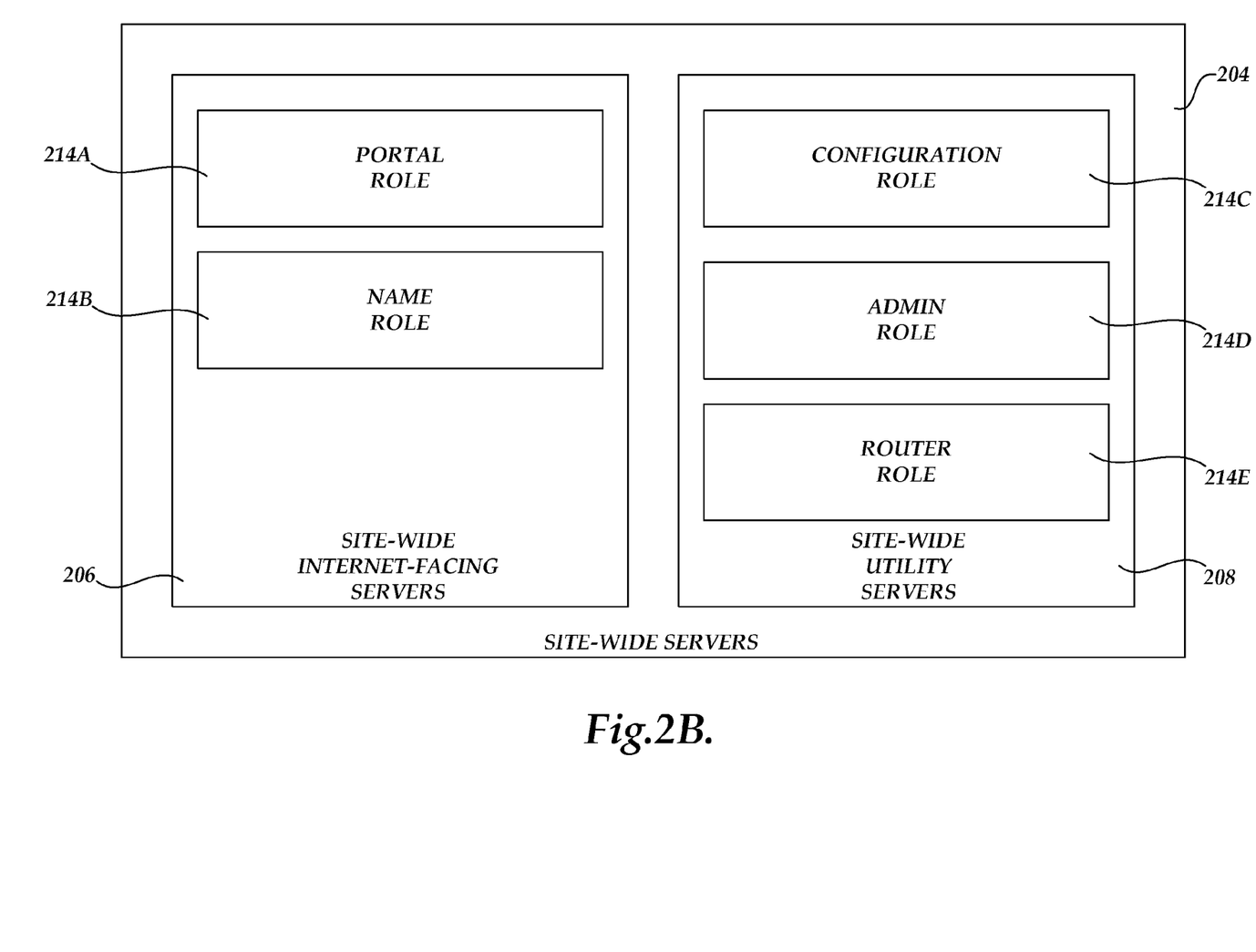

Turning now to FIG. 2B, additional details will be provided regarding the roles to which the site-wide server computers may be assigned. As shown in FIG. 2B, the site-wide Internet-facing servers 206 may be assigned to a portal role 214A and/or to a name role 214B. Server computers assigned to the portal role 214A are configured to provide the user interfaces (the "portal") for the system 100 that are not tenant specific. For example, server computers assigned to the portal role 214A may be configured to provide sign-up and sign-in Web pages. Server computers assigned to the name role 214B are configured to provide DNS services. For instance, server computers assigned to the name role 214B may be configured to provide network addresses corresponding to sub-domains unique to each tenant. The definition of where tenant address records should point to comes from the configuration role 214C, described below. It should be appreciated that the site-wide Internet-facing servers 206 may be assigned to one or more of the roles shown in FIG. 2B or to other roles not illustrated or described herein.

As also shown in FIG. 2B, the site-wide utility servers may be assigned to a configuration role 214C, an administration role 214D, and/or a router role 214E. Servers assigned to the configuration role 214C are responsible for exposing configuration information from the shared configuration database 122 to other roles. For instance, servers assigned to the configuration role 214C may expose data regarding the available scale groups 202, data regarding the mapping of tenants to scale groups 202, and the resource limits for the scale groups 202. Other information may also be exposed.

Servers assigned to the administration role 214D are configured for performing administrative tasks for manipulating the system 200. For example, a server assigned to the administration role 214D may be configured to execute commands to create scale groups, move tenants between scale groups, and to provision tenants for testing, support, or monitoring purposes. Servers assigned to the router role 214E are configured to redirect certain actions to an appropriate scale group 202. For instance, a server assigned to the router role 214E may be configured to route a job to provision a new tenant, upgrade the data for a tenant, or to delete a tenant to the appropriate scale group 202. Other types of actions may be routed in a similar manner. It should be appreciated that the site-wide utility servers 208 may be assigned to one or more of the roles shown in FIG. 2B or to other roles not illustrated or described herein.

Figure 2C:
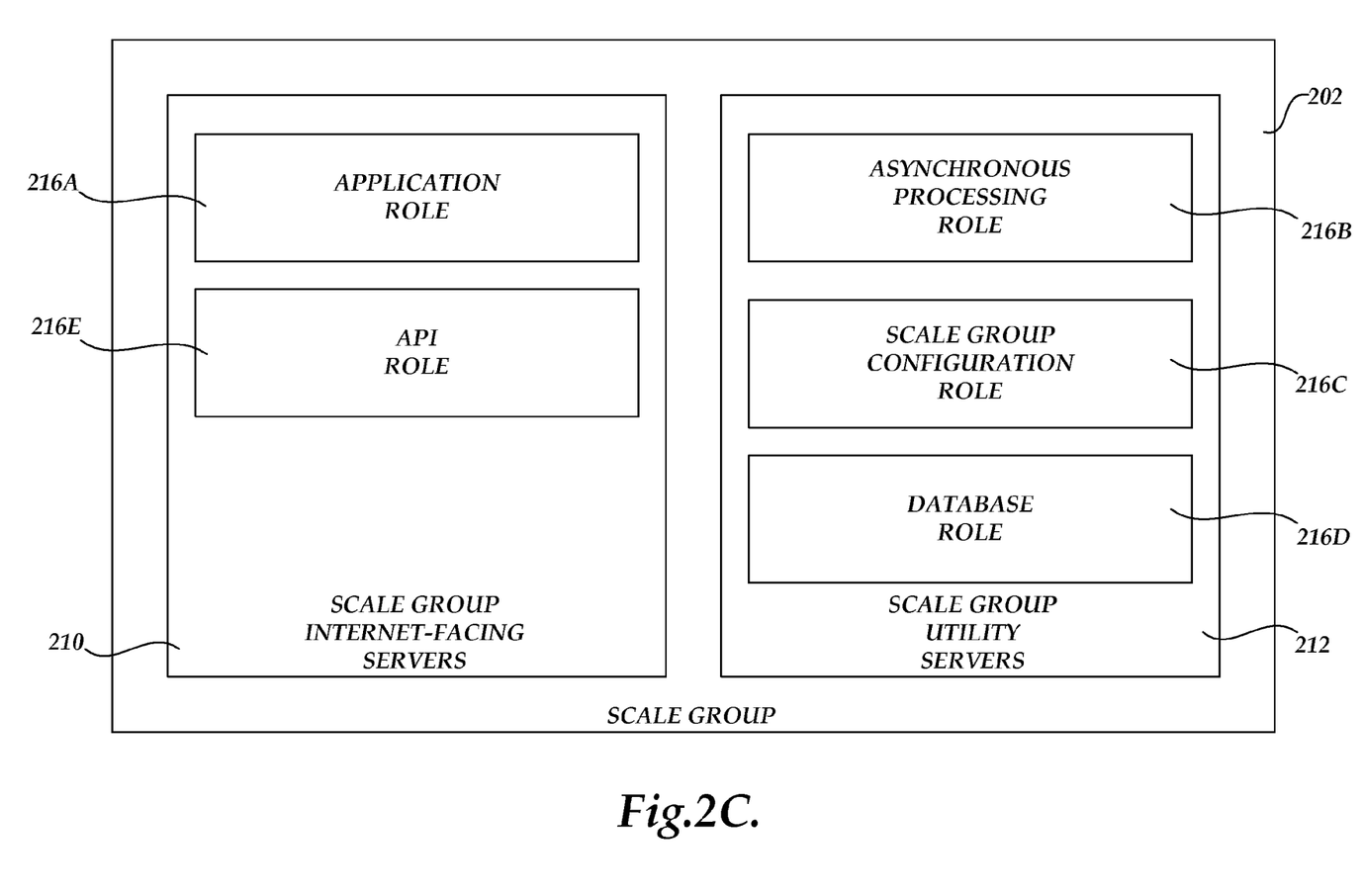

Referring now to FIG. 2C, additional details will be provided regarding the roles to which the server computers in each of the scale groups 202 may be assigned. As shown in FIG. 2C, the scale group Internet-facing servers 210 are assigned to the application role 216A. Servers assigned to this role are responsible for providing the actual application 106 that is used by the tenants. Servers assigned to the application role 216A may also be configured to assign long-running tasks to a server computer assigned to an asynchronous processing role 216B, described below. Server computers may also be assigned to an application programming interface ("API") role 216E. The API role 216E allows its consumers to execute remote procedures through web service APIs, thereby enabling rich clients and other integration applications to access features provided by the system 200.

As also shown in FIG. 2C, the scale group utility servers 212 may be assigned to an asynchronous processing role 216B, the scale group configuration role 216C, and/or the database role 216D. Servers assigned to the asynchronous processing role 216B are configured to off-load long running operations from the application role 216A. Some examples include provisioning a new tenant, upgrading tenant data, deleting a tenant, bulk data import to a tenant, and bulk data extraction. Servers assigned to the scale group configuration role 216C are responsible for maintaining configuration settings for the scale group. Examples include data identified the servers that have been assigned to a scale group and data identifying the physical server that a tenant's data resides on. Server computers assigned to the database role 216D are configured to maintain the unshared organization databases 120. It should be appreciated that the scale group Internet-facing servers 210 and the scale group utility servers 212 may be assigned to one or more of the roles shown in FIG. 2C or to other roles not illustrated or described herein.

It should be appreciated that, in one embodiment, each of the roles described above may be assigned to two or more computing systems. By assigning each role to two or more computers, redundancy can be achieved. Additionally, this architecture permits zero down time patching of the operating system, the application program, or other dependent programs. The roles and architecture described above also allow the system 200 to address numerous problems associated with previous architectures for hosted multi-tenant applications. For instance, using the roles discussed above, tenants can be provisioned on the system 200 by signing up through a server computer assigned to the portal role 214A. This triggers the router role 214E to decide on a target scale group 202 for the new tenant and to record this selection through the configuration role 214C and the scale group configuration role 216B. After this has been performed, the asynchronous processing role 216B will provision the tenant and initialize an unshared organization database 120 for the new tenant. Once the tenant has been provisioned, end users can sign on to the system 200 through the portal role 214A, where they will be redirected to the application role 216A at their assigned scale group 202 via the name role 214B.

It should also be appreciated that the configuration of the system 200 allows additional capacity to be added or existing capacity to be rebalanced easily. For instance, additional scale groups 202 can be added to accommodate the addition of tenants. Since the new scale groups 202 are not initially serving any tenants, their addition requires only configuration changes. The configuration role 214C allows such changes online without affecting other tenants. Resources can be rebalanced by monitoring tenant resource utilization versus role and scale group capacities and triggering a rebalance if they are near capacity. The name role 214B will detect the change quickly and provide the correct address of the new application role 216A to tenants.

The system 200 also permits the site-wide roles to be upgraded independently of any upgrade to the scale-group roles. In this regard, new site-wide facilities may be added that scale group roles will leverage, in which case the site-wide roles will be upgraded first and the scale group ones thereafter. It is possible, therefore, to operate the system 200 in this half-upgraded state indefinitely, while still permitting new tenants to be added. New scale groups would then generally be constructed with the new versions of the scale group roles. Provision requests that target the new scale groups 202 can take advantage of new functionality immediately. Tenants that require a data upgrade can be upgraded at any time during which they will experience an outage depending upon the nature of the upgrade. After the upgrade, the tenant can use the new functionality that required a data upgrade. Tenants also experience no service outage during system upgrades due to backward compatibility of newer versions of the software. Tenants will only experience an outage when their data is being upgraded to take advantage of new system features. Moreover, one tenant's outage does not affect any other tenant. It should be appreciated that a tenant may not experience an outage where data and code is upgraded that is not visible to the tenant. These types of upgrades can be accomplished completely online without any tenant downtime whatsoever.

It should be appreciated that the concepts and technologies presented herein will generally result in service outages that are smaller in scope than previous solutions. Previous solutions using a shared tenant database typically require service outages having a larger scope. As a result, developers typically utilize upgrade solutions that do not require a service outage. These types of solutions, however, can have a longer development time and increased development costs. By offering an upgrade path that reduces the scope of typical outages, the technologies presented herein offer a viable alternative to developers as compared to the prior upgrade solutions that do not require a service outage.

It should also be appreciated that distribution of the system 200 across multiple data centers may be achieved by defining scale groups 202 pointing to servers in another data center. Crosstalk between subsequent data centers and the first can be minimized through a data replication technique on the configuration role 214C. Speed of name resolution can also be improved by replicating the name role 214B. Geo-locality can also be achieved by defining the scale groups 202 such that their network location is a low latency to network location of the tenant.

Figure 3:
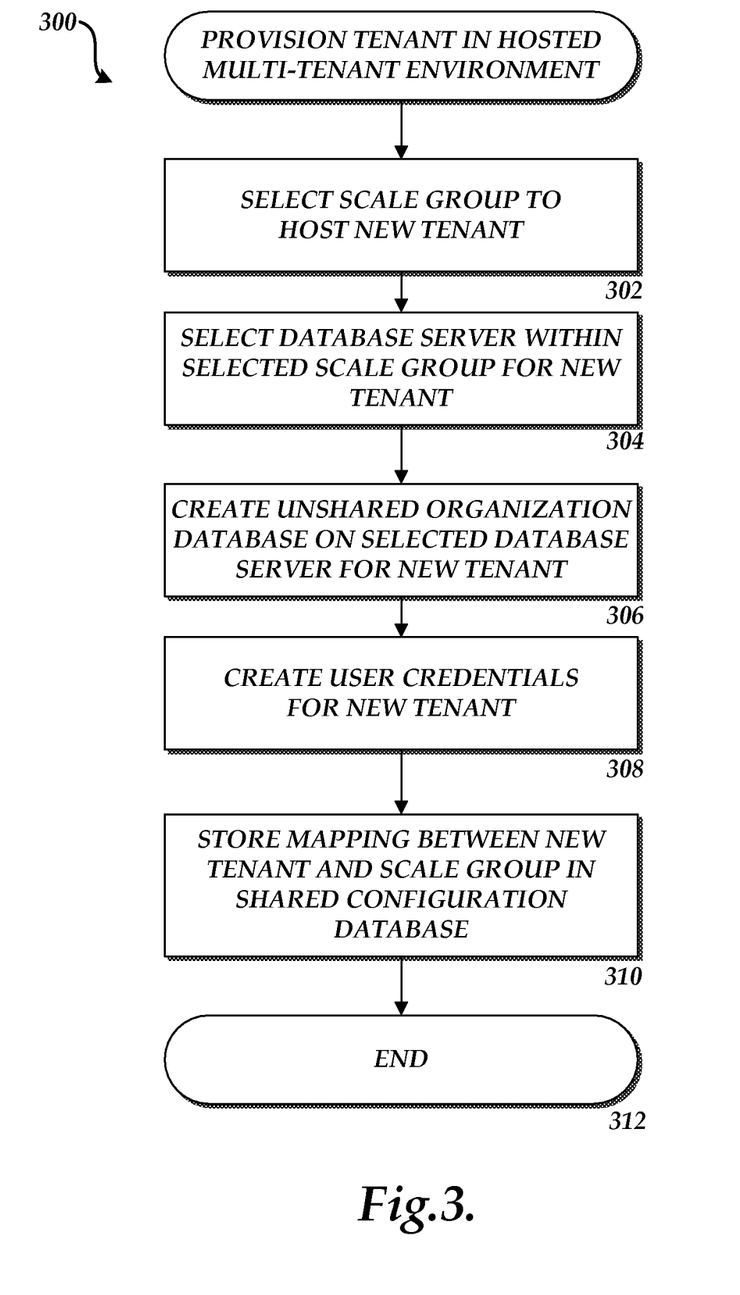
FIGS. 3-5 are flow diagrams showing illustrative processes for providing and utilizing a hosted multi-tenant hosted application according to one implementation described herein.

Turning now to FIG. 3, additional details will be provided regarding the embodiments presented herein for providing a hosted, multi-tenant application. In particular, FIG. 3 is a flow diagram showing a routine 300 that shows aspects of an illustrative process for provisioning a new tenant of the hosted multi-tenant system 200 in one implementation described herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in FIG. 3 and described herein. These operations may also be performed in a different order than those described herein with respect to FIG. 3.

The routine 300 begins at operation 302, where one of the scale groups 202A-202N is selected for the new tenant. According to embodiments, the scale group to which the new tenant is assigned may be selected based upon the average workload of the servers within each 202A-202N. In this manner, a new tenant may be assigned to a scale group 202A-202N that has available computing and storage capacity. It should be appreciated that other factors, such as the geographic location of the tenant and the scale groups, may also be utilized in determining the appropriate scale group 202A-202N to which a new tenant should be assigned.

From operation 302, the routine 300 continues to operation 304. At operation 304, a scale group database server 214 is selected within the assigned scale group to service the unshared organization database 120 for the new tenant. As with the scale groups 202A-202N, the particular scale group database server 214 may be selected based upon the average workload of the scale group database servers 214 within the assigned scale group 202. Other factors may also be utilized in identifying a scale group database server 214 for the new tenant.

Once the scale group 202 and the scale group database server 214 have been selected, the routine 300 proceeds to operation 306, where the selected scale group database server 214 creates the unshared organization database 120 for the new tenant. As discussed above, the unshared organization database 120 is utilized to store data and application customizations for the new tenant and is inaccessible by other tenants.

From operation 306, the routine 300 continues to operation 308, where user credentials are created for the new tenant and stored in the shared configuration database 122. The routine 300 then continues to operation 310, where data is stored in the shared configuration database 122 that associates the new tenant and its users with the assigned scale group 202 and scale group database server 214. Once this data has been stored in the shared configuration database 122, the new tenant has been provisioned and can begin using the hosted application. Accordingly, the routine 300 continues from operation 310 to operation 312, where it ends.

Figure 4:
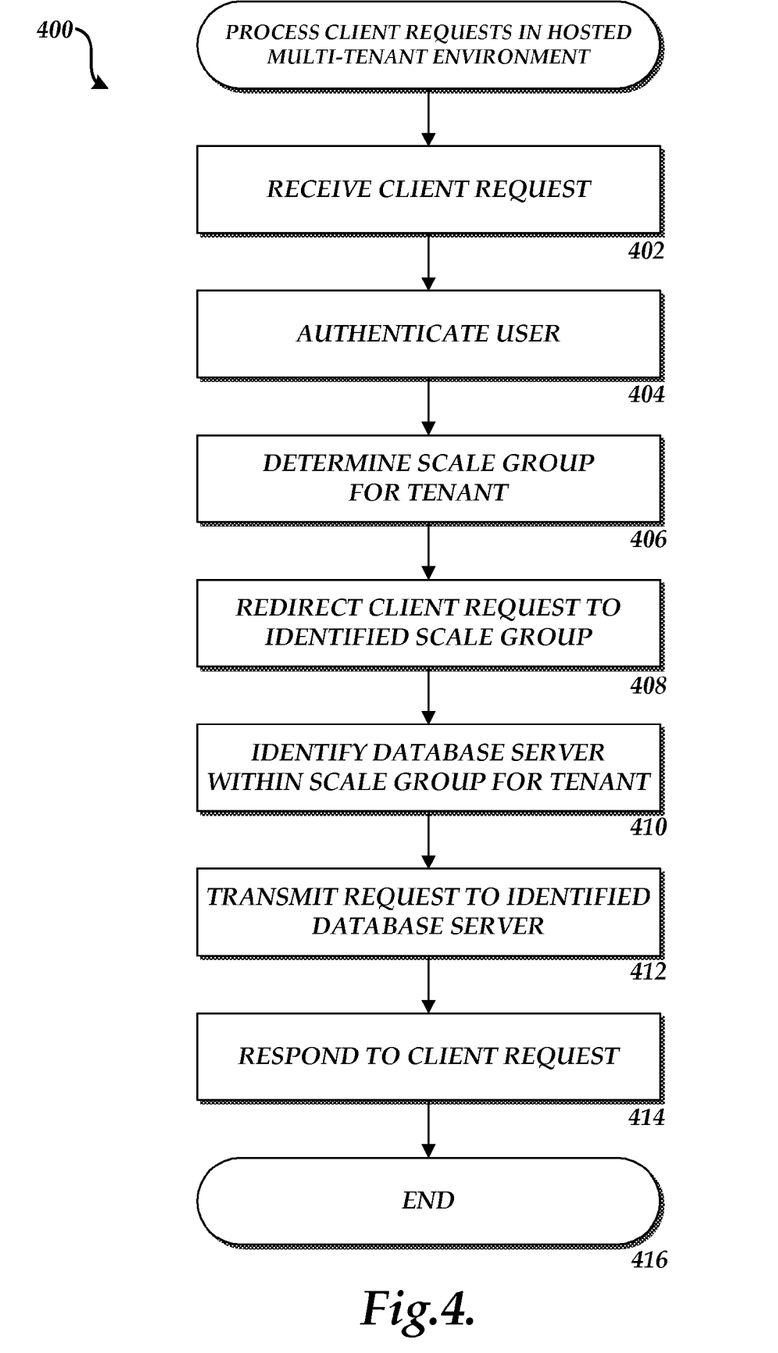

Referring now to FIG. 4, an illustrative routine 400 will be described for processing client requests in the hosted multi-tenant system 200 described above. The routine 400 begins at operation 402, where the site-wide Internet-facing servers 206 receive a request to access the hosted application. In response to receiving such a request, the routine 400 continues to operation 404, where the site-wide utility servers 208 authenticate the user on behalf of whom the request was made and determine the tenant that the user is associated with. These processes are performed utilizing data stored in the shared configuration database 122.

Once the user making the request has been authenticated and the tenant with which the user is associated has been identified, the routine 400 continues to operation 406, where the data stored in the shared configuration database 122 is utilized to identify the scale group 202A-202N associated with the tenant making the incoming request. As discussed above, this data is stored in the shared configuration database 122 at the time the tenant is provisioned. Once the scale group 202 hosting the tenant has been identified, the routine 400 continues to operation 408, where the incoming request is redirected by the site-wide Internet-facing servers 206 to the identified scale group 202.

As discussed briefly above, the server computers assigned to the name role 214B may be configured to provide network addresses corresponding to sub-domains unique to each tenant. For instance, sub-domains may be created for each tenant, such as "http://myorg.crm.dynamics.com." The name role 214B is responsible for maintaining an association between each sub-domain and the network address of the scale group 202 assigned to the corresponding tenant. Through the use of this information, the name role 214B can redirect incoming requests to the appropriate scale group for servicing the requests. It should be appreciated that the sub-domain remains the same for a tenant even if the tenant is migrated to another scale group in another data center. However, the network address of the scale group will be changed following the change to a new scale group.

When a tenant is moved to a new scale group, a client computer that has cached the network address of the old scale group may be redirected to an incorrect scale group. If a scale group detects that a request has been received for a tenant that has been moved to a different scale group, a new temporary sub-domain will be created (for instance "http://temp.myo-rg.crm.dynamics.com") that corresponds to the new scale group for the tenant. The request will then be redirected to the new temporary sub-domain. Once the Internet DNS entry for the main domain has expired, a new lookup will be performed, the next request will be redirected to the name role 214B, and subsequently, will be redirected to the correct network address of the new scale group.

From operation 408, the routine 400 continues to operation 410, where data stored in the shared configuration database 122 is utilized to identify the scale group database server 214 that maintains the unshared organization database 120 for the tenant making the incoming request. Once the appropriate scale group database server 214 has been identified, a connection is made to the identified database server 214 to obtain any private tenant data necessary to respond to the incoming request. This occurs at operation 412. Once the data has been obtained, the data is utilized to respond to the incoming tenant request at operation 414. From operation 414, the routine 400 continues to operation 416, where it ends.

Figure 5:
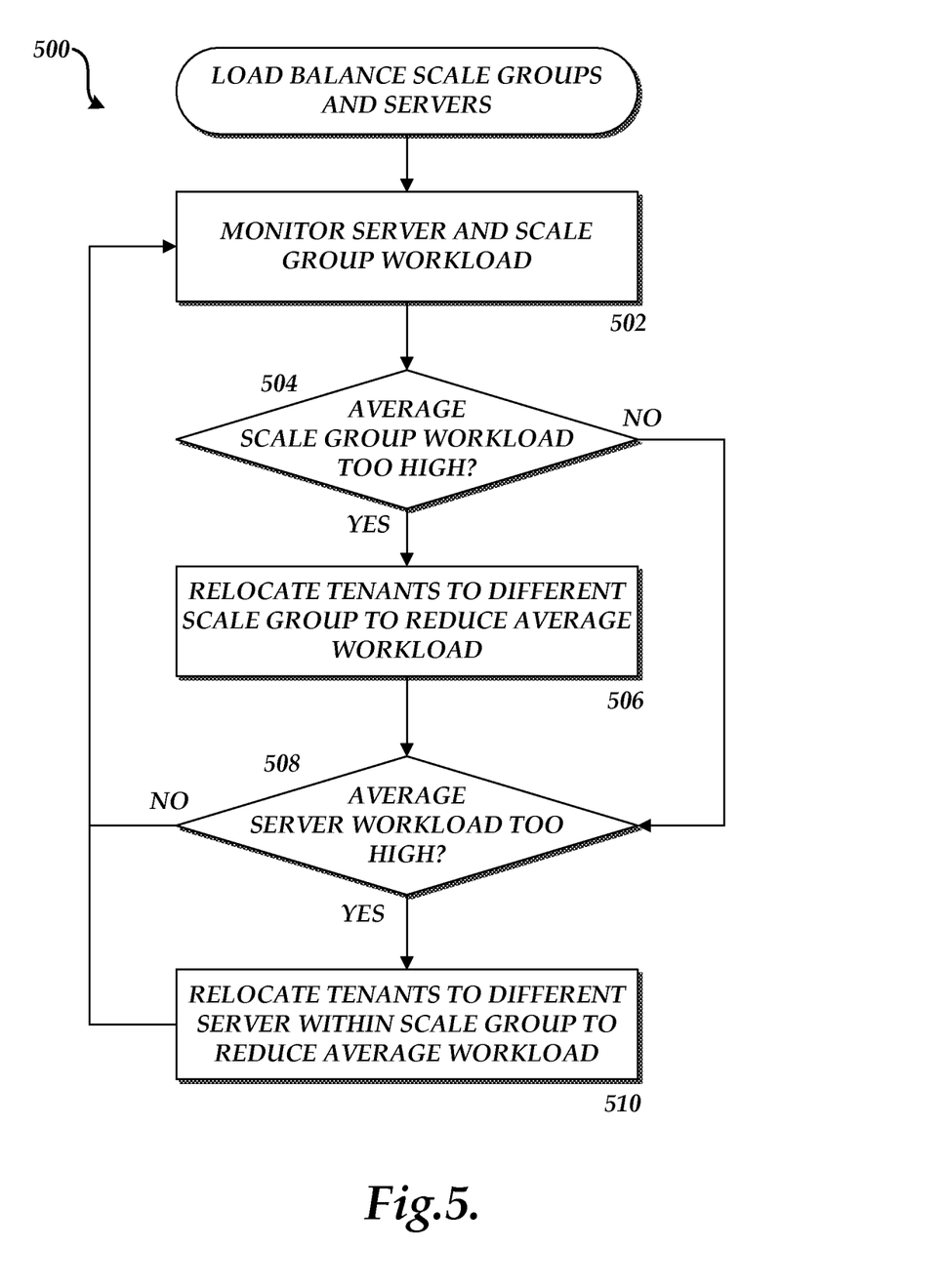

Turning now to FIG. 5, an illustrative routine 500 will be described for load balancing the scale groups 202A-202N and the servers within each of the scale groups 202A-202N. Because each tenant in the systems described herein is assigned a private unshared database, the location of these databases can be easily changed depending upon the load that an individual tenant is placing on the middle-tier and database-tier computing systems. In this manner, the computing resources described above with respect to FIGS. 1-2C can be allocated to the various tenants in an efficient manner that is likely to reduce the possibility that activities by one tenant will adversely impact the performance experienced by other tenants. FIG. 5 illustrates one such process for load balancing the scale groups 202A-202N and the servers within each of the scale groups 202A-202N.

The routine 500 begins at operation 502, where the average workload of the scale groups 202A-202N and the individual server computers within each of the scale groups 202A-202N is monitored. The routine 500 then continues to operation 504, where a determination is made as to whether the average workload for each scale group 202 is too high. If a particular scale group 202 is experiencing an excessive average workload, the routine 500 proceeds to operation 506, where one or more of the private, unshared databases 120A-120N maintained by servers within the identified scale group 202 are moved to another one of the scale groups 202A-202N, preferably with a lower average workload. If none of the scale groups 202A-202N are experiencing an undesirably high workload, the routine 500 proceeds from operation 504 to operation 508.

At operation 508, a determination is made as to whether any server computer within each of the scale groups 202A-202N is experiencing an undesirably high average workload. If so, the routine 500 proceeds from operation 508 to operation 510, where one or more of the private, unshared databases 120A-120N maintained by the identified server are moved to another server computer within the scale group 202 or to another scale group 202. It should be appreciated that when a private, unshared database 120 is moved, the mapping stored in the shared configuration database 122 is updated to reflect the new location of the private, unshared database. From operation 510, the routine 500 returns to operation 502, where the above-described process is periodically repeated to maintain an appropriate workload balance across the scale groups 202A-202N and the server computers located within each of the scale groups 202A-202N.

Figure 6:
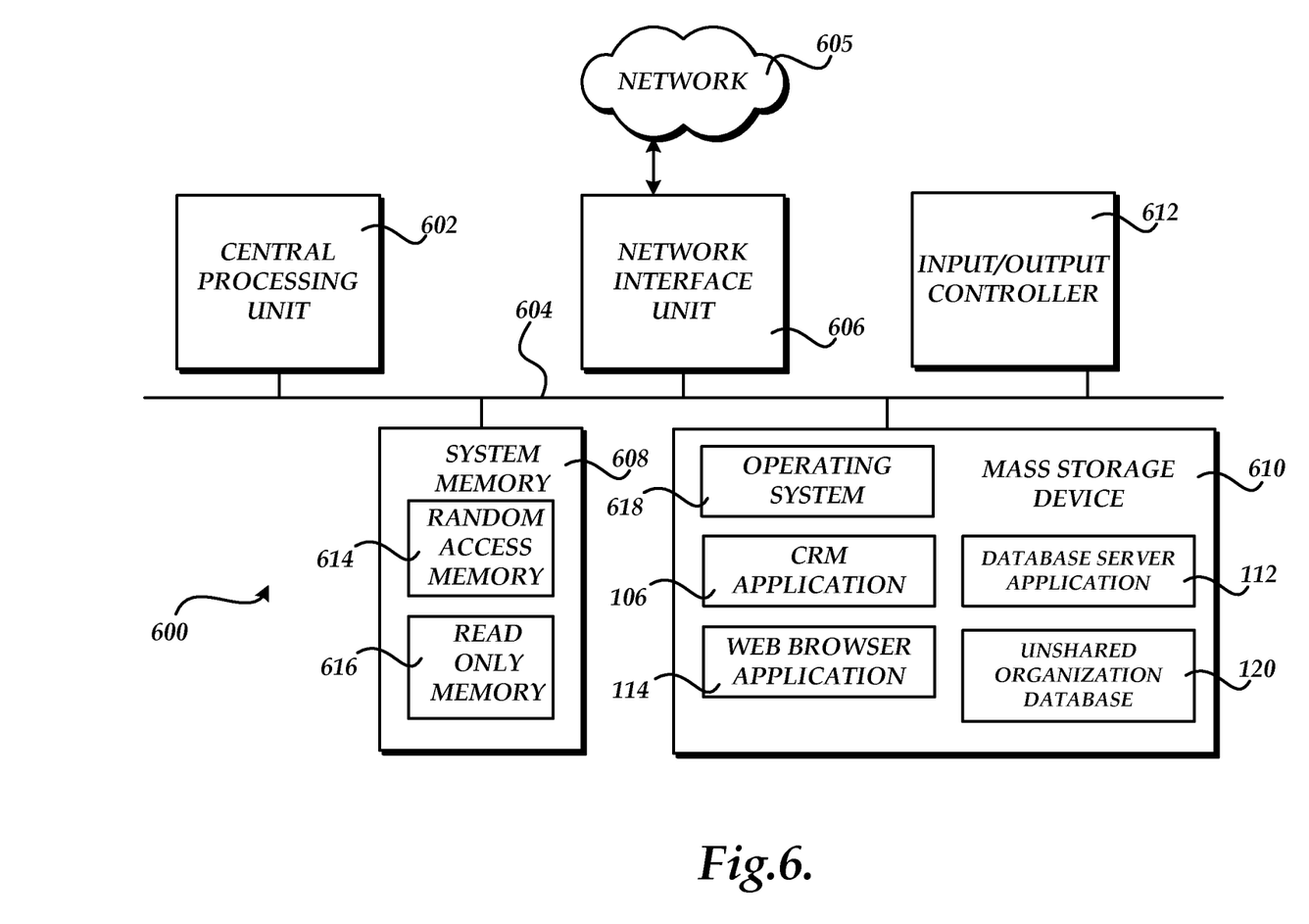
FIG. 6 is a computer architecture diagram showing an illustrative hardware architecture suitable for implementing the computing systems described with reference to FIGS. 1-5.

Referring now to FIG. 6, an illustrative computer architecture for a computer 600 capable of executing the software components described above with respect to FIGS. 1-5 will be discussed. The computer architecture shown in FIG. 6 illustrates a conventional desktop, laptop computer, or server computer and may be utilized to embody any of the computer systems described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 605. The computer 600 may connect to the network 605 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system suitable for controlling the operation of a networked desktop, laptop, or server computer. The mass storage device 610 and RAM 614 may also store one or more program modules. In particular, the mass storage device 610 and the RAM 614 may store the CRM application 106, the web browser application 114, the database server application 112, and the unshared organization database 120, each of which has been described above with reference to FIGS. 1-5. Other program modules described herein may also be stored in the mass storage device 610 and utilized by the computer 600.

Based on the foregoing, it should be appreciated that technologies for providing a hosted multi-tenant application are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for providing a hosted application, the system comprising:
   at least two scale groups, each scale group being configured to support at least one tenant, wherein each scale group comprises a shared middle-tier and a shared database-tier for providing the hosted application to the tenants assigned thereto, and wherein the scale groups are configured to
      determine whether a request has been received for a tenant that has been moved to a different scale group,
      create a new temporary sub-domain corresponding to the different scale group for the tenant in response to determining that a request has been received for a tenant that has been moved to a different scale group, and
      redirect the request for the tenant to the new temporary sub-domain;
   a shared configuration database that is shared by tenants of the hosted application and configured to store mapping data to map an individual assignment of at least two of the tenants of the hosted application to one of the at least two scale groups and tenant customizations for the hosted application; and
   a site-wide server computer configured to receive a request for the hosted application from one of the at least two tenants, to search the shared configuration database for mapping data indicating the one of the at least two scale groups associated with the one of the at least two tenants, and to redirect the request to the one of the at least two scale groups associated with the one of the at least two tenants.

2. The system of claim 1, wherein the scale group is selected from a plurality of geographically distributed scale groups based, at least partially, upon a geographic location associated with the scale group and a further geographic location associated with the tenant.

3. The system of claim 1, wherein the site-wide server computer is assigned to a portal role for providing a non-tenant specific user interface.

4. The system of claim 1, wherein the site-wide server computer is assigned to a name role for providing network addresses corresponding to sub-domains that are unique to each tenant.

5. The system of claim 1, wherein the site-wide server computer is assigned to a configuration role for providing configuration information to one or more other roles.

6. The system of claim 1, wherein the site-wide server computer is assigned to an administration role for performing administrative tasks within the system.

7. The system of claim 1, wherein the site-wide server computer is assigned to a router role for redirecting one or more actions to a scale group.

8. The system of claim 1, wherein a computer in the scale group is assigned to an application role for providing the hosted application.

9. The system of claim 8, wherein a computer in the scale group is assigned to an asynchronous processing role for executing asynchronous processes assigned by the application role.

10. The system of claim 1, wherein a computer in the scale group is assigned to a scale group configuration role for maintaining scale group configuration information.

11. The system of claim 1, wherein a computer in the scale group is assigned to a database role for maintaining data for tenants assigned to the scale group.

12. The system of claim 1, wherein the hosted application comprises a hosted business application.

13. A method for providing a hosted application, the method comprising:
  providing at least two scale groups, each scale group being configured to support at least one tenant;
  storing, at a shared configuration database that is shared by tenants of the hosted application including the at least two scale groups, mapping data to map an individual assignment of at least two tenants of the hosted application to one of the at least two scale groups and tenant customizations for the hosted application;
  receiving, at a site-wide computer, a request for the hosted application from one of the at least two tenants;
  in response to receiving the request, searching the shared configuration database for mapping data indicating the one of the at least two scale groups associated with the one of the at least two tenants, the scale group comprising a database storing a private unshared database associated with the tenant;
  redirecting the request for the hosted application from the site-wide server computer to the one of the at least two scale groups associated with the one of the at least two tenants;
  providing a response to the redirected request for the hosted application from the one of the at least two scale groups associated with the one of the at least two tenants;
  determining if the one of the at least two tenants has been moved to a different scale group;
  creating a new temporary sub-domain corresponding to an address for the different scale group in response to determining that the one of the at least two tenants has been moved to the different scale group; and
  redirecting the request or the one of the at least two tenants to the new temporary sub-domain.

14. The method of claim 13, wherein the site-wide server computers comprise:
  at least one site-wide internet-facing server computer assigned to a portal role and a name role, and
  at least one site-wide utility server assigned to a configuration role, an administration role, and a router role.

15. The method of claim 14, wherein the scale group comprises:
  an internet-facing server computer assigned to an application role, and
  a scale group utility server assigned to an asynchronous processing role, a scale group configuration role, and a database role.

16. A system for providing a hosted application to tenants, the system comprising:
  a plurality of site-wide server computers configured to receive, from a tenant, a request for the hosted application comprising at least two scale groups, each scale group being configured to support at least one tenant, to redirect the request to an assigned scale group associated with the tenant, the assigned scale group comprising a database server storing a private unshared database associated with the tenant, wherein each of the site-wide server computers is assigned to at least one of
    a portal role for providing a non-tenant specific user interface,
    a name role for providing network addresses corresponding to sub-domains that are unique to each of the tenants,
    a configuration role for retrieving configuration information including mapping data to map an individual assignment of at least two tenants of the hosted application to one of the at least two scale groups from a shared configuration database that is shared by the tenants of the hosted application and providing configuration information to one or more other roles,
    an administration role for performing administrative tasks within the system, and
    a router role for redirecting one or more actions to a scale group; and
  a plurality of geographically distributed scale groups including the assigned scale group, each of the scale groups comprising a logical grouping of scale group server computers assigned to at least one of
    an application role for providing the hosted application to the tenant,
    an asynchronous processing role for executing asynchronous processes assigned by the application role,
    a scale group configuration role for maintaining scale group configuration information, and
    a database role for maintaining data for tenants assigned to the scale group, the data comprising tenant customizations associated with the hosted application.

17. The system of claim 16, wherein the scale group is configured to:
  determine if the tenant that has been moved to a different scale group, create a new temporary sub-domain corresponding to an address for the different scale group, in response to determining that the tenant has been moved to the different scale group, and
redirect the request for the tenant to the new temporary sub-domain.

\* \* \* \* \*